United States Patent [19]
Kath et al.

[11] Patent Number: 5,945,070
[45] Date of Patent: Aug. 31, 1999

[54] REACTION VESSEL FILTER FOR COMBINATORIAL CHEMISTRY OR BIOLOGICAL USE

[75] Inventors: Gary S. Kath, Scotch Plains; Gregory W. King, Carteret, both of N.J.

[73] Assignee: Merck & Co., Inc., Rahway, N.J.

[21] Appl. No.: 08/955,434

[22] Filed: Oct. 21, 1997

Related U.S. Application Data

[60] Provisional application No. 60/029,350, Oct. 31, 1996.

[51] Int. Cl.⁶ .................................................... B01L 11/00

[52] U.S. Cl. ........................... 422/101; 422/81; 422/100; 422/102; 73/863.85

[58] Field of Search ................................. 422/56, 58, 81, 422/100, 101, 102, 103, 104; 73/863.85

[56] References Cited

U.S. PATENT DOCUMENTS

| | | | |
|---|---|---|---|
| 3,965,889 | 6/1976 | Sachs | 422/101 X |
| 4,995,967 | 2/1991 | Van Driessche | 210/94 |
| 5,271,903 | 12/1993 | Durst et al. | 422/101 |

FOREIGN PATENT DOCUMENTS

| | | |
|---|---|---|
| 2 314 322 | 12/1997 | United Kingdom . |
| WO 96/22157 | 7/1996 | WIPO . |
| WO 96/33010 | 10/1996 | WIPO . |
| WO 97/04863 | 2/1997 | WIPO . |

*Primary Examiner*—Harold Y. Pyon
*Attorney, Agent, or Firm*—Dianne Pecoraro; Elliott Korsen; Mark Daniel

[57] ABSTRACT

A filter tube for a reaction or other fluid vessel is disclosed which maintains the vessel under an inert gas atmosphere and maintains the integrity of the inert gas seal while performing filtered or unfiltered filling or filtered draining operations.

5 Claims, 3 Drawing Sheets

REACTION VESSEL FILTER FOR COMBINATORIAL CHEMISTRY OR BIOLOGICAL USE

This application is a provisional application No. 60/029, 350 filed on Oct. 31, 1996.

BACKGROUND OF THE INVENTION

A filter tube for a reaction or other fluid vessel is disclosed which maintains the vessel under an inert gas atmosphere and maintains the integrity of the inert gas seal while performing filtered or unfiltered filling or filtered draining operations. The invention uses an air gap between the vessel opening and the top of a filter tube which allows pressure equalization within the vessel during the filling and draining operations. Pressure equalization prevents the loss of liquid during heating operations and permits the use of higher pressure atmosphere within the vessel. The invention can be used for a number of laboratory and clinical operations on a variety of size and shape vessels. A vessel with this filter tube is very well suited for use in laboratory automation systems including automated solid phase chemical synthesis, biological screening and other procedures known to those in the scientific fields.

When performing solid phase chemical synthesis or other chemistry, clinical or biological fluid handling operations, it is desired to have a fluid containment vessel with the following features: chemically inert, controlled atmosphere and temperature, capability for mixing, inlet port for fluid addition, fritted outlet port for waste and product drainage. The vessel must also be compatible with as many automated systems as possible, as there is a clear trend toward automating as much laboratory work as possible.

In considering the design of such a vessel, the inlet and outlet ports, used for fluid addition and removal, are critical features. The integrity of the inert atmosphere and solid support retention are dependent upon proper design of these ports.

In some vessel designs, fluid enters the top of the vessel and drains out the bottom of the vessel through manually operated valves. Solids are maintained inside the vessel by means of a frit at the bottom of the vessel. The frit serves as a filter which allows for the passage of fluid and the retention of solid materials. This type of valving arrangement is suitable for a small number of reaction vessels but is not practical for automatic filling and draining of a larger array of vessels because both a top and a bottom valve are required for each reaction vessel. In addition, every valve added to a system decreases reliability and increases the chance for contamination of the reaction mixture.

What is needed is a vessel which does not require valves or a u-tube system and which will allow for the delivery of liquids, slurries and gases which can be stirred, mixed, heated, cooled and other wise reacted. Further this vessel must be capable of maintaining an inert or reactive atmosphere and must protect against leakage or spillage of its contents.

SUMMARY OF THE INVENTION

A filter tube assembly is presented which comprises a filter sipper tube insert and a transfer probe for use in a septum sealed vessel; the sipper tube insert having side walls which enclose a hollow center cavity, the walls having at least one opening along their length, the sipper tube insert further having top and bottom ends which are open so as to communicate with the environment outside the bottom of the tube with the environment inside and above the tube; the bottom end of the filter sipper tube having a porous frit inserted therein; the hollow center of the filter sipper tube being constricted at a docking point below the opening in the side wall, the dimensions of the docking point being sized to receive the transfer probe; the transfer probe comprising two concentric cannula, each cannula being hollow and having a top and bottom end, the bottom end of the inside cannula having a beveled shaped bottom end, designed to dock with the docking point of the sipper tube, the opening of the inside cannula being alignable with the inside of the constricted portion of the sipper tube such that liquid or gas may be communicated from inside the cannula, through the sipper tube and frit and into the environment outside the sipper tube when the transfer probe is docked with the filter sipper tube; the top of the inside cannula being sized to permit the entry or exit of gas or liquids into the cannula for delivery or removal to the filter sipper tube; the bottom of the outer cannula terminating in the outer wall of the inside cannula at a point above the beveled shaped bottom; and the top of the outer cannula terminating in the outer wall of the inside cannula at a point below the top of the inside cannula, the outer cannula having a port which permits entry or exit of gases and liquids, and having an aperture which aligns with the opening in the wall of the sipper tube insert when the transfer probe is docked with the filter sipper tube constricted region; the sipper tube insert being sized to fit within a vessel containing a septum port, and the transfer probe being capable of piercing the septum port and entering the top of the sipper tube; such that fluid or gas may be delivered to the environment surrounding the sipper tube insert by dispensing the fluid or gas from the inner cannula onto the top of the docking point of the sipper tube insert and the fluid or gas moves into the environment through the aperture in the wall of the sipper tube and fluids or gases may be removed from the environment surrounding the sipper tube insert by moving the beveled end of the inner cannula into the docking point of the sipper tube and withdrawing the liquid or gas through the frit and into the inner cannula.

DESCRIPTION OF THE INVENTION

Figure 1:
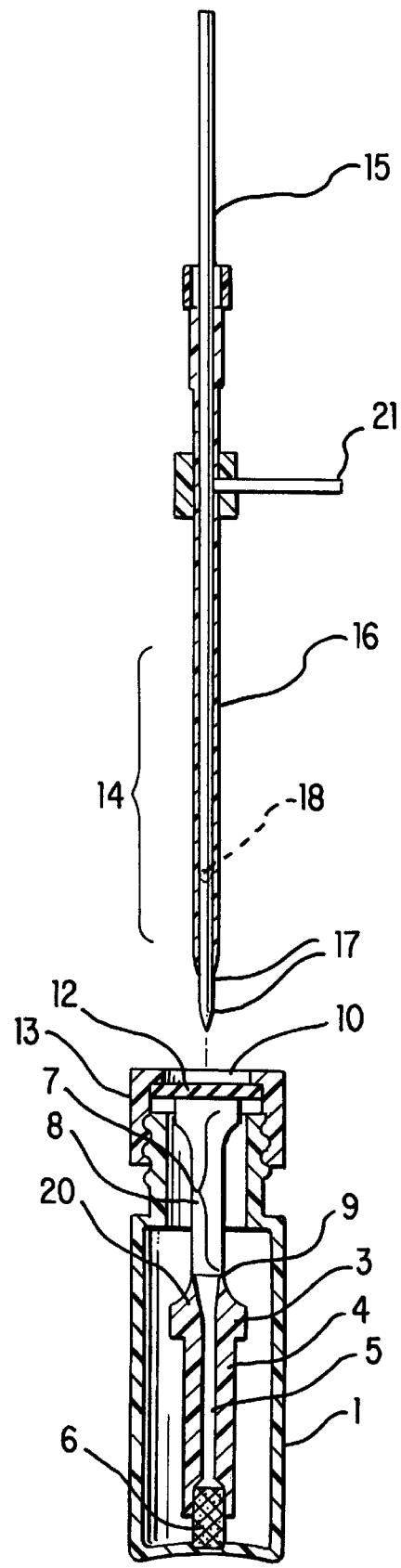
FIG. 1 is a cross-sectional side view of a single reaction vessel with a filter tube suitable for dispensing fluid into the vessel.

A filter tube assembly is presented which comprises a filter sipper tube insert and a transfer probe for use in a septum sealed vessel; the sipper tube insert having side walls which enclose a hollow center cavity, the walls having at least one opening along their length, the sipper tube insert further having top and bottom ends which are open so as to communicate with the environment outside the bottom of the tube with the environment inside and above the tube; the bottom end of the filter sipper tube having a porous frit inserted therein; the hollow center of the filter sipper tube being constricted at a docking point below the opening in the side wall, the dimensions of the docking point being sized to receive the transfer probe; the transfer probe comprising two concentric cannula, each cannula being hollow and having a top and bottom end, the bottom end of the inside cannula having a beveled shaped bottom end, designed to dock with the docking point of the sipper tube, the opening of the inside cannula being alignable with the inside of the constricted portion of the sipper tube such that liquid or gas may be communicated from inside the cannula, through the sipper tube and frit and into the environment outside the sipper tube when the transfer probe is docked with the filter sipper tube; the top of the inside cannula being sized to permit the entry or exit of gas or liquids into the cannula for delivery or removal to the filter sipper tube; the bottom of the outer cannula terminating in the outer wall of the inside cannula at a point above the beveled shaped bottom; and the top of the outer cannula terminating in the outer wall of the inside cannula at a point below the top of the inside cannula, the outer cannula having a port which permits entry or exit of gases and liquids, and having an aperture which aligns with the opening in the wall of the sipper tube insert when the transfer probe is docked with the filter sipper tube constricted region; the sipper tube insert being sized to fit within a vessel containing a septum port, and the transfer probe being capable of piercing the septum port and entering the top of the sipper tube; such that fluid or gas may be delivered to the environment surrounding the sipper tube insert by dispensing the fluid or gas from the inner cannula onto the top of the docking point of the sipper tube insert and the fluid or gas moves into the environment through he aperture in the wall of the sipper tube and fluids or gases may be removed from the environment surrounding the sipper tube insert by moving the beveled end of the inner cannula into the docking point of the sipper tube and withdrawing the liquid or gas through the frit and into the inner cannula.

The device of this invention permits fluid addition and waste or product removal from a vessel while maintaining an inert atmosphere over a range of operating pressures and temperatures. The sipper tube insert has an air gap between the vessel access port and the top of the sipper tube which will not leak under various operating pressures. The device may be used with septum, valved, plugged or other vessel entry openings and can fit into almost any type of vessel, and allows for mixing or the contents of the vessel by rocking or shaking and allows techniques such as refluxing to be used. The invention can be applied to solid phase chemical synthesis as well as any other chemical, clinical, or biological operation where filtering through a frit is necessary while maintaining an atmosphere controlled seal.

BRIEF DESCRIPTION OF THE DRAWINGS

FIG. 1 shows a typical embodiment of the filter sipper tube of the present invention being used with a septum capped vial.

Figure 2:
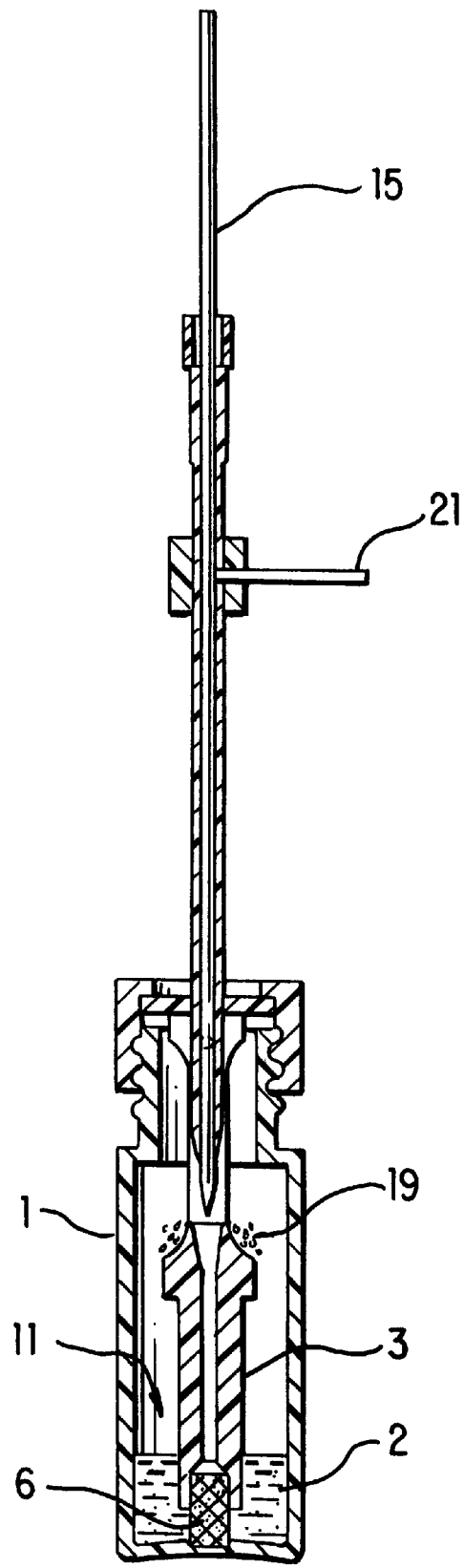
FIG. 2 is a cross-sectional side view of a reaction vessel with a filter sipper tube suitable for dispensing fluid into the vessel.

FIG. 2 shows the operation of the device during the dispensing operation.

Figure 3:
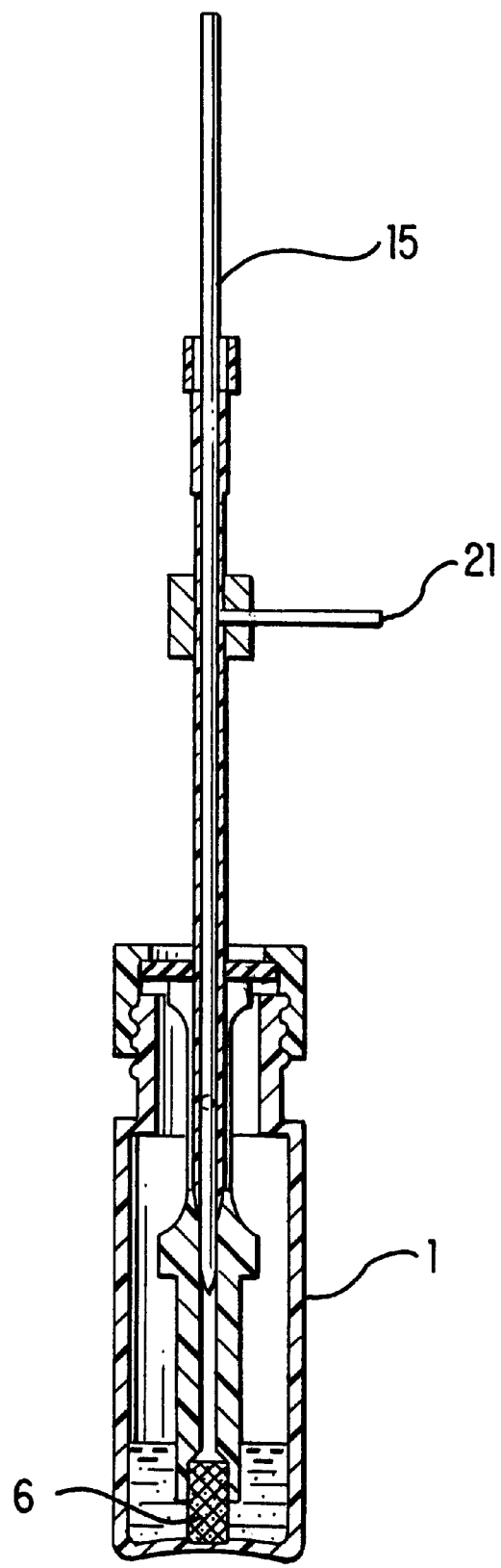
FIG. 3 is a cross-sectional side view of a reaction vessel with a filter sipper tube and transfer probe in position for aspirating fluid from the vessel.

FIG. 3 shows the operation of the device during the draining operation using the concentric cannula.

DETAILED DESCRIPTION OF THE PREFERRED EMBODIMENTS

A chemically suitable vessel (1), constructed of material such as glass, TEFLON®, polypropylene and the like, contains the fluid and solid mixture (2). The filter sipper tube insert (3) is placed into the vessel (1) and aligned such that the top of the filter sipper tube insert (3) is positioned near an access port or valve opening. The filter sipper tube comprises a tube (4) with an axial through hole (5), and frit or filter (6) connected at one end. When in use, the filter sipper tube (3) is placed inside the vessel with fritted end extending down to the inside bottom of the vessel (1). The filter sipper tube (3) can be made of any suitable material such as HDPE, glass, or other materials that will not interact with the solvents, gases or reactants used.

The top of the filter sipper tube (3) is suspended in the center of the vessel (1) by support ribs (7) or other means such that an air gap (8) exists between the top of the filter sipper tube (9) and inlet port (10) of the vessel (1). The air gap (8) will insure an equalization of pressure between the top of the filter sipper tube (9) and the gas (11) above the fluid (2).

In one embodiment of the invention, a septum sheet (12) such as silicon rubber, natural rubber, or Teflon coated elastomer and a screw or press fit cap (13) is placed on the vessel to maintain the inert atmosphere within the vessel. Other access ports may be used to seal the vessel such rotary valves, plugs, caps, and other devices know to those in this field.

To fill a septum sealed vessel, a manually or automatically positioned transfer probe (14) is position above the septum (12) and moved so as to pierce through the septum (12) with bottom end of the transfer probe (14). The transfer probe (14) consist of a smaller gauge inner cannula (15) inside a larger gauge outer needle (16) with tapered nose cone (17) sealing the outer needle (16) to the outside of the inner needle (15). A small hole (18) was drilled through the wall of the outer needle (16) a short distance up from the nose cone (17). Fluid can be aspirated or dispensed through the inner needle (15) while inert gas can flow through the outer needle (16) and small hole (18). Once the coaxial needle nose cone (17) and needle vent hole (18) have been positioned through the septum (12), fluid may be dispensed into the vessel (1) by driving liquid down the inner needle (15). As fluid (19) flows out the tip of the needle it spills through the air gap (8) and into the reaction vessel (1). As fluid (19) enters into the vessel (1), gas (11) exits through the vent hole (18) in the coaxial needle (14). Fluid slurries may also be dispensed into the vessel since the fluid spills into the vessel (1) bypassing the frit (6). The needle is then withdrawn from the vessel (1). Since the top of the filtered sipper tube (9) and the liquid (2) inside the vessel are exposed to the same gas pressure (11), the system will not leak and can be operated over a range of pressures and temperatures.

To aspirate and filter fluid from the vessel (1), the coaxial needle (14) is placed through the vessel access port (10) into the vessel (1) and extends down until the needle nose cone (17) makes a seal to the top of the filter sipper tube which is referred to as the docking point (9). If the top (9) of the filter sipper tube has a female taper (20), the seal can be made using a needle having a male tapered nose cone (17) which mates with at the top (9) of the sipper tube. Other methods of sealing the needle to the top of the sipper tube (9) are included within the scope of this invention, such as machining the inside diameter of the sipper to the same as the OD of the needle and relying on a press fit or by placing a suitable o-ring or septum to the top of the filter sipper tube (9). Once this connection is established, fluid may be aspirated from the vessel (1). As fluid is aspired, inert gas (21) is fed into the vessel via the vent hole (18) in the coaxial needle (14).

FIG. 2 is a cross-sectional side view of a reaction vessel with a filter tube (9) suitable for dispensing and aspirating fluid into the vessel (1) as well as the ability to rock the vessel (1) for mixing. In this arrangement, the filter sipper tube (3) invention consist a tube (4) with axial through hole (5), and integral frit/filter (6) connected at one end. The filter sipper tube (3) is placed inside the vessel (1) with fritted end (6) extending down to the inside bottom of the vessel (1). Midway up the fritted sipper tube (3), a vent slot (22) is cut through one side of the filter sipper tube (3) and a larger axial hole (23) is drilled to the top of the fritted sipper insert (3). A female taper (20) or other suitable seal is made to the top (9) of the lower half of the sipper tube. The top of the vial may be sealed with a septum, valve or plug.

To dispense fluid into the vessel, a coaxial needle (14) is passed axially down the filter sipper tube (3) until the tip of needle is positioned at the vent slot (22) in the filter sipper tube (3). As fluid is dispensed through the needle, it spills out the vent slot (22) into the vessel. Fluid may be added to the vessel until the level is just below the bottom of the vent slot (22). Air inside the vessel (11) escapes through the top of the vent slot (22) and out the coaxial needle's vent hole (18). The needle is then withdrawn from the vessel.

To mix by rocking, the vessel is positioned horizontally with vent slot (22) facing upward. The vessel is then rocked by tilting up/down. The fluid will move back and forth inside the vessel without ever flowing out the vent slot (22).

Refluxing the contents of the vessel is accommodated by chilling the top neck of the filter sipper tube while heating the vessel. In this arrangement any droplets condensing on the inside top portion of the sipper tube fall back down and out the sipper's vent slot (22).

FIG. 3 is a cross-sectional side view of a reaction vessel with a filter sipper tube suitable for dispensing fluid into the vessel.

Mixing as by rotation or up/down displacement of the filter sipper tube is possible using this configuration of the device. Other means for mixing the contents of the vessel with the sipper tube in place are such as spinning the sipper tube, vibrating the sipper tube, are also within the scope of this invention.

This device provides a number of advantages over conventional reaction and fluid containment vessels where assess to fluid is necessary for filling and draining operations. The design is very well suited for automatic fill and draining operations using conventional pipetting equipment or other robotic or automation equipment. It can be used with almost any type and size vessel including but not limited to test tubes, vials, beakers, flasks, jars, 96-well plate, and other vessels known to those of ordinary skill in the art areas where this device would be used. Since the device has no bottom drain port, heating and cooling of the vessel is simplified. In addition an array of vessels can be accommodated more easily because of this streamlined design.

Because of the air tight design, operations can be carried out under an inert atmosphere with no fluid loss. Higher inert gas pressures may also be used since the top of the sipper tube and the fluid in the vessel always have the same applied pressure. If a leak develops in the septum due to multiple pierces of the aspirating/dispensing needle, the vessel will not leak it's contents.

Since there are no check valves, u-tubes or o-rings, reliability is increased and cost of manufacturing can decrease. In addition, there is less chance of frit/filter blockage because fluid additions can automatically back-flush the frit. Also, since each vessel is drained one-at-a-time in a multi-vessel array, there is more vacuum capacity available for draining. In addition, it would be possible to incorporate a sensor in the aspiration tip to insure an individual vessel was drained.

What is claimed is:

1. A filter tube assembly which comprises a filter sipper tube insert and a transfer probe for use in a septum sealed vessel; the sipper tube insert having side walls which enclose a hollow center cavity, the walls having at least one opening along their length, the sipper tube insert further having top and bottom ends which are open so as to communicate with the environment outside the bottom of the tube with the environment inside and above the tube; the bottom end of the filter sipper tube having a porous frit inserted therein; the hollow center of the filter sipper tube being constricted at a docking point below the opening in the side wall, the dimensions of the docking point being sized to receive the transfer probe; the transfer probe comprising two concentric cannula, each cannula being hollow and having a top and bottom end, the bottom end of the inside cannula having a beveled shaped bottom end, designed to dock with the docking point of the sipper tube, the opening of the inside cannula being alignable with the inside of the constricted portion of the sipper tube such that liquid or gas would be communicated from inside the cannula, through the sipper tube and frit and into the environment outside the sipper tube when the transfer probe is docked with the filter sipper tube; the top of the inside cannula being sized to permit the entry or exit of gas or liquids into the cannula for delivery or removal to the filter sipper tube; the bottom of the outer cannula terminating in the outer wall of the inside cannula at a point above the beveled shaped bottom; and the top of the outer cannula terminating in the outer wall of the inside cannula at a point below the top of the inside cannula, the outer cannula having a port which permits entry or exit of gases and liquids, and having an aperture which aligns with the opening in the wall of the sipper tube insert when the transfer probe is docked with the filter sipper tube constricted region; the sipper tube insert being sized to fit within a vessel containing a septum port, and the transfer probe being capable of piercing the septum port and entering the top of the sipper tube; such that fluid or gas would be delivered to the environment surrounding the sipper tube insert by dispensing the fluid or gas from the inner cannula onto the top of the docking point of the sipper tube insert and the fluid or gas moves into the environment through the aperture in the wall of the sipper tube and fluids or gases would be removed from the environment surrounding the sipper tube insert by moving the beveled end of the inner cannula into the docking point of the sipper tube and withdrawing the liquid or gas through the frit and into the inner cannula.

2. The device of claim 1 wherein the sipper tube insert is made of a malleable plastic material which allows for a junction between the sipper tube insert and the inner cannula of the transfer probe.

3. The device of claim 1 wherein the beveled tip of the inner cannula of the transfer probe is coated with a malleable plastic which facilitates the junction between the sipper tube insert and the inner cannula.

4. The device of claim 1 wherein the septum is replaced by a valve.

5. The device of claim 1 wherein the septum is replaced by a removable plug.

* * * * *